(12) United States Patent
Bigarre et al.

(10) Patent No.: US 9,227,187 B2
(45) Date of Patent: Jan. 5, 2016

(54) METHOD FOR PREPARING PROTON-CONDUCTING INORGANIC PARTICLES

(75) Inventors: Jannick Bigarre, Tours (FR); Renaud Perrin, Tours (FR); Pierrick Buvat, Montbazon (FR); Herve Galiano, La Ville Aux Dames (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 253 days.

(21) Appl. No.: 13/990,226

(22) PCT Filed: Nov. 28, 2011

(86) PCT No.: PCT/EP2011/071164
§ 371 (c)(1),
(2), (4) Date: May 29, 2013

(87) PCT Pub. No.: WO2012/072572
PCT Pub. Date: Jun. 7, 2012

(65) Prior Publication Data
US 2014/0113982 A1    Apr. 24, 2014

(30) Foreign Application Priority Data

Nov. 30, 2010  (FR) .................................... 10 59945

(51) Int. Cl.
*B01J 39/20*    (2006.01)
*H01B 1/12*     (2006.01)
*C08J 5/22*     (2006.01)

(52) U.S. Cl.
CPC ................ *B01J 39/20* (2013.01); *C08J 5/2275* (2013.01); *H01B 1/122* (2013.01)

(58) Field of Classification Search
USPC ....................................... 252/184; 521/28, 31
See application file for complete search history.

(56) References Cited

U.S. PATENT DOCUMENTS

| 2008/0102339 A1 | 5/2008 | Galiano et al. | |
| 2013/0092873 A1* | 4/2013 | Buvat et al. ................... | 252/184 |

FOREIGN PATENT DOCUMENTS

| FR | 2869032 A1 | 10/2005 |
| WO | 2006090862 A1 | 8/2006 |

OTHER PUBLICATIONS

Staiti, P., et al., "Membranes based on phosphotungstic acid and polybenzimidazole for fuel cell application", "Journal of Power Sources", 2000, pp. 231-235, vol. 90.*
Malhotra, S., et al., "Membrane-Supported Nonvolatile Acidic Electrolytes Allow Higher Temperature Operation o~ Proton-Exchange Membrane Fuel Cells", "J. Electrochem. Soc.", 1997, pp. L23-L26, vol. 144, No. 2.*
Baradie, B., et al., "Water Sorption and Protonic Conductivity in a Filled/Unfilled Thermostable Ionomer for Proton Exchange Membrane Fuel Cell", "Macromol. Syrup.", 1999, pp. 85-91, vol. 138.*
Baradie, B., et al., "Water Sorption and Protonic Conductivity in a Filled/Unfilled Thermostable Ionomer for Proton Exchange Membrane Fuel Cell", "Macromol. Symp.", 1999, pp. 85-91, vol. 138.
Hirata, K., et al., "Preparation and Characterization of Highly Proton-Conductive Composites Composed of Phosphoric Acid-Doped Silica Gel and Styrene-Ethylene-Butylene-Styrene Elastomer", "Journal of Sol-Gel Science and Technology", 2000, pp. 61-69, vol. 17.
Malhotra, S., et al., "Membrane-Supported Nonvolatile Acidic Electrolytes Allow Higher Temperature Operation of Proton-Exchange Membrane Fuel Cells", "J. Electrochem. Soc.", 1997, pp. L23-L26, vol. 144, No. 2.
Note: For the non-patent literature citations that no month of publication is indicated, the year of publication is more than 1 year prior to the effective filing date of the present application.

* cited by examiner

*Primary Examiner* — Peter D Mulcahy
*Assistant Examiner* — Henry Hu
(74) *Attorney, Agent, or Firm* — Hulquist, PLLC; Mary B. Grant

(57) ABSTRACT

The invention relates to a method for functionalization of inorganic particles by polymers comprising at least one recurrent unit bearing at least one proton exchange group comprising the following steps:
   a) a step for functionalization of inorganic particles by an anionic polymerization termination agent comprising at least one group capable of being bound to the surface of said particles;
   b) a step for anionic polymerization of at least one monomer bearing at least one precursor group of a proton exchange group;
   c) a step for putting the particles obtained in step a) in contact with the polymers obtained in step b), in return for which the obtained particles are particles functionalized by said polymers by reaction between a reactive end of said polymeric polymers and at least one group of the aforementioned termination agent; and
   d) a step for transformation of the precursor group(s) of said proton exchange group(s).

20 Claims, No Drawings

METHOD FOR PREPARING PROTON-CONDUCTING INORGANIC PARTICLES

CROSS-REFERENCE TO RELATED APPLICATIONS

This application is a U.S. national phase under the provisions of 35 U.S.C. §371 of International Patent Application Ser. No. PCT/EP11/71164 filed Nov. 28, 2011, which in turn claims priority of French Patent Application No. 1,059,945 filed Nov. 30, 2010. The disclosures of such international patent application and French priority patent application are hereby incorporated herein by reference in their respective entireties, for all purposes.

TECHNICAL FIELD

The present invention relates to a method for preparing proton-conducting particles by functionalization of said particles with organic compounds bearing at least one proton exchange group.

The present invention also relates to particles obtained by this method.

These particles have the characteristic of having particularly high ion exchange capacity.

Consequently, these particles find their application in the elaboration of proton-conducting materials, in particular materials intended to enter the structure of proton-conducting membranes for fuel cells, such as cells operating with $H_2$/air or with $H_2/O_2$ (known under the acronym PEMFC meaning <<Proton Exchange Membrane Fuel Cell>>) or operating with methanol/air (known under the acronym of DMFC meaning <<Direct Methanol Fuel Cell>>).

Thus, the technical field of the invention may generally be defined as that of proton-conducting particles and of materials containing them.

More specifically, the invention is located in the field of proton-conducting particles used in the structure of membranes for fuel cells operating at low temperatures.

STATE OF THE PRIOR ART

A fuel cell is an electrochemical generator which converts chemical energy from an oxidation reaction of a fuel in the presence of an oxidizer into electric energy.

Generally, a fuel cell includes a plurality of electrochemical cells mounted in series, each cell comprising two electrodes of opposite polarity separated by a proton exchange membrane acting as a solid electrolyte.

The membrane ensures passage towards the cathode of the protons formed during the oxidation of the fuel at the anode.

Membranes structure the core of the cell and therefore have to have good performances as regards proton conduction, as well as low permeability to reactant gases ($H_2$/air or $H_2/O_2$ for PEMFC cells and methanol/air for DMFC cells). The properties of the materials making up the membranes are essentially thermal stability, resistance to hydrolysis and to oxidation as well as some mechanical flexibility.

Currently used membranes meeting these requirements are membranes obtained from polymers consisting of a perfluorinated linear main chain and of lateral chains bearing sulfonic acid groups. From among the most well-known, mention may be made of membranes marketed under the name of NAFION® by Dupont de Nemours or under the name of DOW®, FLEMION® or Aciplex by Dow Chemicals and Asahi Glass. These membranes have good electrochemical performances and a lifetime of interest but nevertheless insufficient for PEMFC applications. Further, their cost (more than 500 euros/m$^2$) remains prohibitive for marketing. For DMFC applications, they have high permeability towards methanol, which also limits their use with this type of fuel. Finally, these membranes have significant sensitivity to temperatures above 80° C., which excludes them from a use in cells operating at high temperatures, i.e. between 80° C. and 150° C.

Moreover, it is known that the conducting efficiency of a proton membrane is strongly related to the presence of water and therefore to the capability of retaining water of the membrane. Now, at temperatures close to 100° C., and even more beyond this, water is rapidly discharged from the membrane, thereby causing a drop of the conductivity and increasing the permeability towards the fuel. At these temperatures, this decrease in performances may be accompanied by degradation of the membrane. In order to solve the drying problems of the membrane in high temperature fuel cells, i.e. at least equal to 100° C., maintaining a maximum relative humidity of the order of 80% to 100% is required but is difficult to achieve with an external hydration source.

In order to increase the retention of water in high temperature fuel cell membranes, certain authors focused on the development of more complex membranes comprising mineral particles, in addition to a matrix in a conducting organic polymer. These membranes are notably designated by the terminology of <<inorganic-organic hybrid membranes>>.

The first hybrid membranes were developed as soon as the end of the 90's.

Thus, Mahotr et al., in J. Electrochem. Soc., 1997, 144 [1] describe membranes which resist to temperatures ranging up to 110° C., comprising a polymer of the Nafion® type impregnated with a doping solution of mineral heteropolyacids.

Other hybrid membranes based on non-sulfonated polymers, such as polybenzimidazoles (Staiti et al., J. Power Sources, 2000, 90, 231 [2]), polyarylethersulfones (Baradie et al., Macromol. Symp., 1999, 138, 85 [3]), styrene/ethylene/butene/styrene copolymers (Hirate et al., J. Sol-Gel Sci. And Techn., 2000, 17, 61 [4]) each incorporating conducting heteropolyacids of the tungstophosphoric type have also been studied.

However, these hybrid membranes have the drawback of requiring a loading level of heteropolyacids which may attain 70% in order to come closer to the performances of Nafion® membranes.

In order to circumvent the drawbacks related to the use of particles of the heteropolyacid types described above, certain authors replaced this type of particles with clay particles.

Clay particles, when they are incorporated in membranes based on a conducting organic polymer, prove to be particularly of interest for the following reasons:
 they give the membranes excellent properties for retaining water;
 they prove to be particularly stable at high temperatures;
 they have good percolation properties for low loading levels.

However, the authors who developed these membranes loaded with clay particles, noticed that the provision of clay particles did not significantly improve the proton conductivity of the membrane.

The authors of the present invention therefore set themselves the goal of proposing a method for preparing inorganic particles functionalized with organic compounds bearing at least one proton exchange group, which have the following advantages:

* the possibility of modulating the ion exchange capability of said particles;
* the possibility of also accessing particles having high ion exchange capability (which may be greater than 5 mequiv./g).

DISCUSSION OF THE INVENTION

Thus, the invention according to a first object relates to a method for functionalizing inorganic particles with polymers comprising at least one recurrent unit bearing at least one proton exchange group comprising the following steps:

a) a step for functionalization of inorganic particles with an anionic polymerization termination agent comprising at least one group capable of binding to the surface of said particles;

b) a step for anionic polymerization of at least one monomer bearing at least one precursor group of a proton exchange group;

c) a step for putting particles obtained in step a) in contact with polymers obtained in step b), in return for which the resulting particles are particles functionalized with said polymers by reaction between a reactive end of said polymers and at least one group of the aforementioned termination agent; and d) a step for transforming the precursor group(s) into said proton exchange group(s).

Before going into further detail in the present description, we shall specify the following definitions.

By polymer, is conventionally meant in the sense of the invention, a compound formed by the linking of one or more recurrent units.

By recurrent unit, is conventionally meant, in the sense of the invention, a bivalent group (i.e. a group for forming a bridge) stemming from a monomer after polymerization of the latter.

By termination agent, is conventionally meant in the sense of the invention, a compound capable of stopping the polymerization propagation process (here in the case at hand, an anionic polymerization) in a polymeric chain, which means, in other words that, by means of one of its groups, a reactive end bearing a negative charge of the polymer prepared in step b) reacts with the termination agent, in return for which, in the context of the invention, the thereby prepared polymer in step b) is grafted onto the surface of the particles via the termination agent remainder itself bound to the surface of the particles (this termination agent remainder resulting both from the reaction of this termination agent with the surface of the particles in order to be bound to the latter and from the reaction of this thereby bound agent with the reactive end of the polymer prepared in step b)).

Thus, by applying the method of the invention, it is thereby possible to obtain proton conducting inorganic particles with properties which may be modulated as regards the ion exchange capability, by acting on the amount of termination agent functionalizing the surface of the particles on the one hand and on the amount of recurrent units bearing at least one proton exchange group present in the polymers prepared in step b), on the other hand, which polymers are then subsequently grafted, during step c), on the termination agent remainders functionalizing the surface of the particles. By acting on both of these aspects, it is thus possible to access particles which may have a very high ion exchange capability and which may notably be greater than 5 mequiv·g$^{-1}$.

As mentioned above, the method of the invention first comprises a step for functionalization of inorganic particles with an anionic polymerization termination agent comprising at least one group capable of being bound to the surface of said particles (step a), this step may consist of putting said termination agent in contact with said particles.

Said inorganic particles may be zeolite particles, zirconium phosphate particles, zirconium phosphonate particles, clay particles, oxide particles such as silica, alumina, zirconia, titanium oxide.

In particular, the inorganic particles may be oxide particles, such as silica particles.

Advantageously, the particles are hydrophilic particles including at their surface hydrophilic groups, such as —OH groups, these groups may then be involved in the binding of the aforementioned termination agents to the surface of said particles.

Particles comprising hydrophilic groups at their surface, such as —OH groups, may be oxide particles, such as silica particles, these particles intrinsically comprising such groups when they are in contact with the humidity of air.

As regards the termination agents, the latter have to include at least one group capable of reacting with at least one group present at the surface of the particles in order to form a chemical bond, such as a covalent bond.

In particular, when the particles comprise at their surface —OH groups, the groups of the termination agents capable of binding to the surface of the particles in order to form a chemical bond, such as a covalent bond, may be selected from the groups of the following formulae:

—COOR$^1$ with R$^1$ representing a hydrogen atom, an alkyl group comprising from 1 to 30 carbon atoms or a phenyl group;

—COCl;

—COCH$_2$CO—R$^1$ with R$^1$ representing a hydrogen atom, an alkyl group comprising from 1 to 30 carbon atoms or a phenyl group;

—PO(OH)$_2$, —PO(OR$^2$)(OH) or —PO(OR$^2$)(OR$^3$) with R$^2$ and R$^3$, either identical or different, representing an alkyl group comprising from 1 to 30 carbon atoms or a phenyl group;

—CO(NHOH);

-M(OR$^4$)$_{n-x-1}$Z$_x$ with x being an integer ranging from 0 to (n−1), M being a metal or a metalloid, n being a degree of oxidation of M, R$^4$ representing a hydrogen atom, an alkyl group comprising from 1 to 30 carbon atoms, a phenyl group, a monovalent metal cation, or a group of formula N$^+$R$^1_4$, with R$^1$ representing a hydrogen atom, an alkyl group comprising from 1 to 30 carbon atoms, or a phenyl group, and Z represents a hydrogen atom, an alkyl group comprising from 1 to 30 carbon atoms, a phenyl group or a halogen atom;

—SO$_3$M' with M' representing a hydrogen atom, a monovalent metal cation or a group of formula N$^+$R$^1_4$ with R$^1$ representing a hydrogen atom, an alkyl group comprising from 1 to 30 carbon atoms or a phenyl group;

—B(OM')$_2$ with M' representing a hydrogen atom, a monovalent metal cation or a group of formula N$^+$R$^1_4$ with R$^1$ representing a hydrogen atom, an alkyl group comprising from 1 to 30 carbon atoms or a phenyl group;

—OH;

and combinations thereof.

For the group of formula -M(OR$^4$)$_{n-x-1}$Z$_x$ as defined earlier, M may represent a metal element, such as a transition element with a given oxidation degree n or a metalloid element such as Si, Ge, Te with a given degree of oxidation n, the degrees of oxidation which may be contemplated for each metal or metalloid element being known to one skilled in the art.

As an example of groups which comply with this definition, mention may be made of the group of formula:

—Si(OR$^4$)$_{3-x}$Z$_x$ with x being an integer ranging from 0 to 3, Z and R$^4$ having the same definitions as those given above.

More particularly, a suitable group may be an alkoxysilane group, such as a trimethoxysilane group, a triethoxysilane group.

The anionic polymerization termination agents also comprise at least one group capable of reacting with the anionic end of the polymer prepared in step b) in order to form a covalent bond with the latter, this covalent bond being established between said polymer and the termination agent remainder bound to the surface of the particle, the formation of the covalent bond may be accomplished according to a nucleophilic substitution mechanism as illustrated by the following reaction scheme:

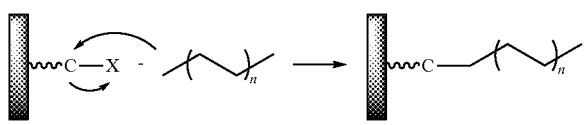

the group —C—X bound to the corrugated bond schematically illustrating the termination agent remainder bound to the surface of a particle (represented here by a full vertical bar), the compound bearing a negative charge at its end, schematically illustrating the polymer prepared in step b).

In order to ensure the termination of an anionic polymerization, the termination agents may thus comprise a —C—X group, X being an electro attractor atom and/or group, and in particular a halogen atom.

Termination agents according to the invention may be compounds comprising at least one alkoxysilane group (as a group capable of being grafted to the surface of inorganic particles, such as silica particles) and at least one —C—X group as defined above (as a group capable of ensuring the termination of anionic polymerization).

More particularly, termination agents according to the invention may be halogenoalkoxysilane compounds.

As examples of such compounds, mention may be made of chloromethylphenylethyltrimethoxysilane, chloromethylphenylethyltriethoxysilane, which fit the following general formula:

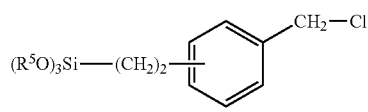

wherein $R^5$ is a methyl group (for chloromethylphenylethyltrimethoxysilane) or an ethyl group (for chloromethylphenylethyltriethoxysilane).

Secondly, the method comprises a step for anionic polymerization of at least one monomer bearing at least one precursor group of a proton exchange group.

The proton exchange group may be a sulfonic acid group —$SO_3H$, a carboxylic acid group —$CO_2H$ or a phosphonic acid group —$PO_3H_2$, these groups may optionally be present as salts.

The precursor group of a proton exchange group is a chemical group which may be transformed by a suitable chemical reaction into a proton exchange group.

In the case when the proton exchange groups are sulfonic acid, carboxylic acid or phosphonic acid groups, optionally as a salt, the precursor groups of such groups may advantageously be carboxylic acid ester groups, sulfonic acid ester groups or phosphonic acid ester groups.

A suitable reaction for transforming these precursor groups into proton exchange groups of the carboxylic acid, sulfonic acid or phosphoric acid type is a hydrolysis reaction, for example a hydrolysis in an acid medium.

Advantageously, the proton exchange group is a phosphonic acid group —$PO_3H_2$, optionally as a salt, and the precursor groups of a phosphonic acid group is a phosphonic acid ester group.

The monomers capable of being used within the scope of step b) may be:
* ethylenic monomers bearing a carboxylic acid ester group;
* ethylenic monomers bearing a sulfonic acid ester group; and
* ethylenic monomers bearing a phosphonic acid ester group.

As examples of ethylenic monomers bearing a carboxylic acid ester group, mention may be made of the monomers of the following formula:

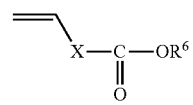

wherein:
—X is a simple bond or a benzyl group;
—$R^6$ is an alkyl group.

As examples of ethylenic monomers bearing a sulfonic acid ester group, mention may be made of the monomers of the following formula:

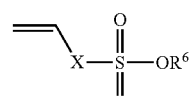

wherein:
—X is a simple bond or a benzyl group;
—$R^6$ is an alkyl group.

As examples of ethylenic monomers bearing a phosphoric acid group and their corresponding esters, mention may be made of monomers of the following formula:

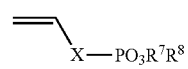

wherein:
*X is a simple bond or a benzyl group;
*$R^7$ and $R^8$ represent independently of each other, an alkyl group.

When X is a simple bond, mention may be made as specific examples of monomers, of diethyl vinylphosphonate ($R^7$ and $R^8$ then represent an ethyl group), dimethyl vinylphosphonate ($R^7$ and $R^8$ then representing a methyl group), diisopropyl vinylphosphonate ($R^7$ and $R^8$ then representing a diisopropyl group).

When X is a benzyl group, the monomers thus correspond to the following formula:

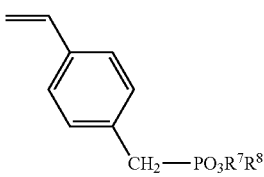

specific examples of such monomers may be diethylbenzyl phosphonate ($R^7$ and $R^8$ then representing an ethyl group), dimethylbenzyl phosphonate ($R^7$ and $R^8$ representing a methyl group).

In addition to the aforementioned monomers, the polymerization step may take place in the presence of other monomers different from those aforementioned above, these monomers may be styrenic monomers or further methacrylate monomers.

As examples of styrenic monomers, mention may be made of styrene as such, paramethylstyrene and mixtures thereof.

As examples of methacrylate monomers, mention may be made of alkyl methacrylates, such as tert-butyl methacrylate, methyl methacrylate.

The anionic polymerization step b) is conventionally achieved in the presence of a polymerization initiator, which is a basic compound, which may be selected from alkyllithium compounds, such as butyl lithium (symbolized as BuLi).

Once the anionic polymerization step b) is achieved, the functionalized particles obtained at the end of step a) and the polymers obtained at the end of step b) are put into contact during step c), in return for which the resulting particles of this contacting step are particles functionalized with said polymer by reaction between a reactive end of the polymer and at least one of the groups of said termination agent.

The reaction scheme discussed above may be taken up again in order to explain the aforementioned step c).

As the monomers of step b) (and consequently the resulting polymers) include a precursor group of said proton exchange group, the method of the invention comprises a step for transforming these precursor groups into proton exchange groups (step d).

This transformation step consists of applying a conventional step of organic chemistry within the reach of one skilled in the art.

As an example, when the monomers of step b) (and thus the resulting polymers) include a precursor group of the carboxylic acid ester, sulfonic acid ester or phosphonic acid ester type, the transformation step may consist in a simple hydrolysis step, for example in an acid medium.

A specific method according to the invention is a method, wherein:
 the particles are silica particles;
 the termination agent is a halogenoalkoxysilane compound, such as chloromethylphenylethyltrimethoxysilane;
 the monomer including a precursor group of a proton exchange group used in step b) is diethyl vinylphosphonate, this monomer being optionally used in combination with at least one styrenic monomer, such as styrene.

The object of the invention is also particles which may be obtained with the method as described earlier.

Such particles appear as particles functionalized by polymeric chains including recurrent units comprising proton exchange groups, these chains being bound to the particles via a spacer group, which is a termination agent remainder (i.e. the remainder of the termination agent, after the latter has reacted by means of one of its groups, with a group present at the surface of the particles for functionalizing the latter, the remainder of the termination agents may thus be covalently bound to the surface of the particle on the one hand and, by means of another of its groups, with the anionic end of the polymeric chains from step b)), in return for which the polymeric chains are bound covalently with the remainder of the termination agent on the other hand.

As an example, when the particles are silica particles, the termination agent is chloromethylphenylethyltrimethoxysilane and the monomer including a precursor group of a proton exchange group used in step b) is diethyl vinylphosphonate; the resulting particles, after hydrolysis of the phosphonate groups into phosphonic acid groups, are silica particles, to which are covalently bound termination agent remainders of the following formula:

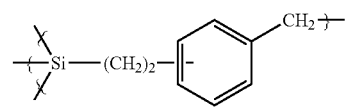

via a silicon atom (as illustrated in the formula above), these remainders being bound to polymeric chains comprising a linking of recurrent units stemming from vinylphosphonic acid (these units resulting from the hydrolysis of recurrent units stemming from the polymerization of diethyl vinylphosphonate) via the group —$CH_2$— of said remainders.

Said particles have excellent proton-conducting properties and therefore ion mobility properties.

These particles may therefore be used for entering the structure of proton-conducting composite materials, which composite materials may enter the structure of proton exchange membranes, in particular proton exchange membranes intended to enter the structure of fuel cells.

The object of the invention is therefore also a conducting composite material comprising a polymeric matrix within which are dispersed particles as defined above.

According to a first alternative, the polymeric matrix may be a matrix in a non-proton-conducting polymer.

Such polymers may be fluorinated polymers such as polytetrafluoroethylene (PTFE), polyvinylidene fluoride (PVDF), tetrafluoroethylene/ethylene copolymer (ETFE) and derivatives thereof. The fluorinated polymers notably have the advantage of having good mechanical strength as well as good chemical resistance.

Such polymers may also be aromatic or heterocyclic polymers. It is specified that by aromatic or heterocyclic polymers, is meant a polymer for which the main chain comprises a linkage of aromatic units (for example phenylene) or heterocyclic units (for example, benzimidazole). Among these polymers, mention may be made of polysulfones, polyaryletherketones, polyimides, polybenzimidazoles, polyphenylene oxides, polycarbonates. Such polymers have the particularity of imparting to the composite material into which they are integrated, high rigidity and chemical and thermal resistance, without requiring the incorporation into the composite material of a reinforcement or filler addition.

According to a second alternative, the polymeric matrix may be a proton-conducting polymeric matrix.

Such a matrix may comprise sulfonated perfluorinated polymers. It is specified that, by sulfonated perfluorinated polymers, are meant polymers comprising a perfluorinated linear main chain and lateral chains bearing sulfonic acid groups. Such polymers are notably available commercially under the trade mark of NAFION® by Dupont de Nemours, or ACIPLEX-S® from Asahi Chemical.

Proton-conducting polymers may also be aromatic or heterocyclic polymers bearing acid functions selected from —$SO_3H$, —$PO_3H_2$ and —$CO_2H$. Such polymers may be polysulfones, polyaryletherketones, polyimides, polybenzimidazoles, polyphenylene oxides, polycarbonates.

The composite material according to the invention advantageously appears as a film, for example having a thickness from 10 to 300 μm.

The aforementioned composite materials may be prepared according to two alternative methods.

According to a first alternative, the method successively comprises the following steps:
  mixing, in the absence of solvents, one or more constitutive polymers of the matrix with particles as defined above;
  forming from the mixture obtained the composite material via a molten route.

Alternatively, the method may successively comprise the following steps:
  melting in the absence of solvent, one or more constitutive polymers of the matrix;
  incorporating, into the polymer or the mixture of molten polymers, particles as defined above.

According to the first alternative, the heat treatment generally comprises a step for heating the mixture obtained after the first step to a temperature which may range from 100° C. to 300° C., so as to obtain a molten mixture and a simultaneous or consecutive step for shaping the mixture, in order to obtain the intended composite material, this shaping may consist in calendering.

Among suitable heat treatments via molten route, extrusion may be mentionned.

According to a second alternative, the method successively comprises the following steps:
  a step for mixing a solution comprising particles as defined earlier and one or more solvents with one or more constitutive polymers of the matrix;
  a step for forming from the obtained mixture, a composite material by evaporation of the solvent(s).

According to this second alternative, the solution may be cast on a support, for example in glass, in alumina or further in polyethylene, and the material as a film is then formed by evaporation of the solvent(s). At the end of this method, a material as a film deposited on the support, is obtained. The obtained film may easily be detached from the support, in order to provide a self-supporting proton-conducting film.

It is specified that the solvents which may be used within the scope of this method, may be selected from among aprotic polar solvents such as dimethylformamide, dimethylacetamide, tetrahydrofurane, dimethylsulfoxide, or further chlorinated solvents such as chloroform, but also solvents such as alcohols, ethers, acetone.

Because of their mechanical properties, these materials may be efficiently applied and may lead to sufficiently resistant thin films in order to be used as membranes for a fuel cell.

These membranes advantageously appear as thin films, for example having a thickness from 10 to 300 micrometers.

These membranes advantageously have sufficient imperviousness towards reagent gases (such as $H_2$ and $O_2$) and are preferably stable up to a temperature of at least 150° C.

Preferably, the constitutive composite material of the membrane comprises from 1 to 20% by weight of particles as defined earlier, when the polymer matrix comprises one or more proton-conducting polymers.

Preferably, the constitutive composite material of the membrane comprises from 5 to 70% by weight of particles as defined earlier, when the polymer matrix comprises one or several non-proton-conducting polymers.

It is specified that the above percentages are expressed on the basis of the total weight of the composite material.

Thus, the invention also relates to a device comprising at least one electrode-membrane-electrode assembly, wherein the membrane is as defined above.

The fuel cell device generally comprises several electrode-membrane-electrode assemblies.

In order to prepare such an assembly, the membrane may be placed between two electrodes, for example in fabric or in carbon paper impregnated with a catalyst. The assembly formed with the membrane positioned between both electrodes is then pressed at an adequate temperature in order to obtain good electrode-membrane adhesion.

The electrode-membrane-electrode assembly is then placed between two plates ensuring electric conduction and supply of reagents to the electrodes. These plates are commonly designated by the term of bipolar plates.

The invention will now be described in the light of the examples given below, given as an illustration and not as a limitation.

DETAILED DISCUSSION OF PARTICULAR EMBODIMENTS

Example 1

This example illustrates the preparation of functionalized silica particles according to the invention comprising the following steps:
  a step for grafting silica particles with chloromethylphenylethyltrimethoxysilane (step a);
  a step for anionic polymerization of diethyl vinylphosphonate (step b);
  a step for reaction of the polymer obtained in step b) with silica particles obtained in step a) (step c).

The reaction scheme is the following:

Step a

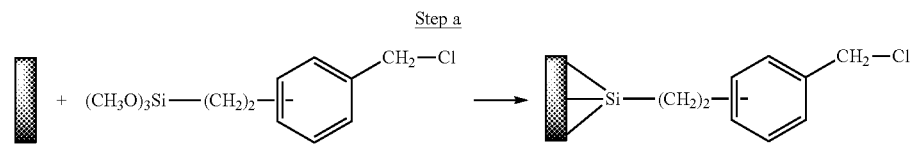

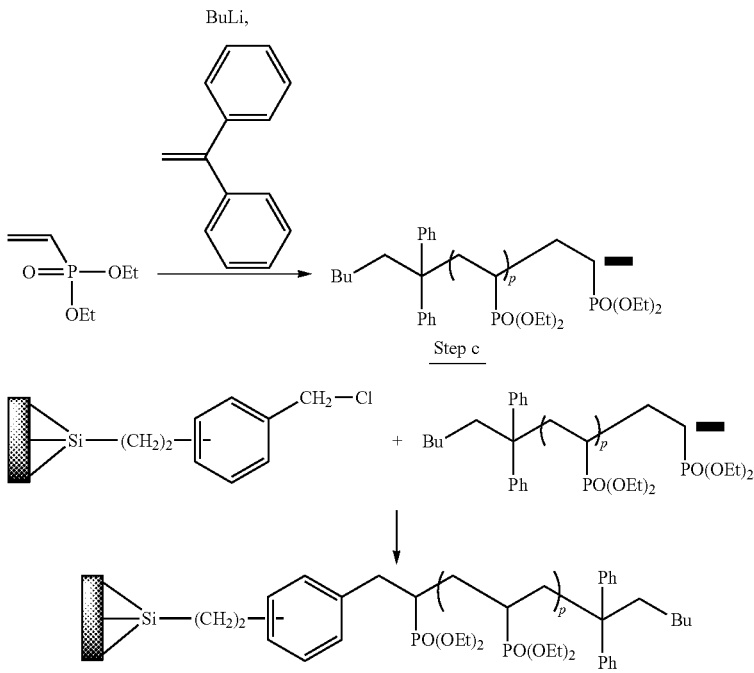

At the end of step c, it is proceeded with hydrolysis of the —PO(OEt)$_2$ groups not shown in this scheme.

The vertical solid line represents a silica particle, the horizontal solid line represents a negative charge, Bu represents a butyl group, Et represents an ethyl group, Ph represents a phenyl group, p represents the number of recurrences of the units taken between brackets.

Step a—Grafting of Silica Particles with Chloromethylphenylethyltrimethoxysilane A suspension of 4 g of silica particles with an average particle size of 7 nm in 300 mL of toluene is refluxed under magnetic stirring and with ultrasonic waves for 1 hour. After adding 6 mL of chloromethyphenylethyltrimethoxysilane, the mixture is reacted for 4 hours with reflux. The thereby functionalized particles are then isolated and washed with ethanol, in order to remove the non-grafted chloromethylphenylethyltrimethoxysilane as well as the hydrolysis product. The obtained powder is dried in vacuo at 100° C. for 24 hours.

A $^{13}$C NMR analysis of the obtained particles shows a chloromethyl group at 46 ppm, which confirms the presence of this group on said particles, this group forming a termination group for anionic polymerization.

A solution S1 of 500 mg of thereby prepared powder dispersed in 50 mL of tetrahydrofurane (THF) is prepared. This solution is degassed with 7 vacuum/argon cycles and maintained under an inert argon atmosphere.

Step b—Anionic Polymerization of Diethyl Vinylphosphonate

In a reactor of 250 mL, equipped with a gas/vacuum inlet, with a thermometer and a septum, dried beforehand at at least 100° C. for 24 hours, are introduced 100 mL of anhydrous tetrahydrofurane (THF). The solution is set under magnetic stirring, cooled to −78° C. and then maintained at this temperature. The system is degassed with at least 7 vacuum/argon cycles. The system is maintained under a very slight sweep of argon. 0.15 mmol of diphenylethylene (symbolized as DPE) and then of n-butyl lithium (BuLi) are introduced until a red-orange color is obtained and finalization is achieved by adding 0.15 mmol de BuLi. The diphenylethylene consists in a co-initiator forming a stable and sterically hindered anion, this co-initiator does not homopolymerize.

After 15 minutes, 12.5 mmol (2.05 g) of diethylvinylphosphonate (symbolized as DEVP) are introduced into the reaction mixture slowly so as to keep the temperature constant. The coloration disappears to the benefit of a slight yellow coloration. The reaction mixture is kept with stirring at −70° C. for 1 h 30 mins.

Step c—Reaction Between the Polymer Prepared in Step b) and the Particles Prepared in Step a)

The solution S1 prepared in step a) is injected into the reactor containing the reaction medium of step b) via a cannula. The whole is stirred under stirring for 12 hours.

The obtained particles are then purified by evaporating the reaction medium. After drying, the grafted particles are hydrolyzed in a solution of hydrochloric acid with reflux for 7 days.

An acid/base assay of the particles gives the possibility of determining an ion exchange capability of 7 mequiv./g.

A $^{13}$C NMR analysis of the obtained particles no longer shows a signal at 46 ppm, which confirms the coupling reaction between the particles obtained in step a) and the polymer prepared in step b).

Example 2

This example illustrates the preparation of functionalized silica particles according to the invention comprising the following steps:
- a step for grafting silica particles with chloromethylphenylethyltrimethoxysilane (step a);
- a step for anionic polymerization of diethyl vinylphosphonate and of styrene (step b);
- a step for reaction of the polymer obtained in step b) with the silica particles obtained in step a) (step c).

The reaction scheme is the following.

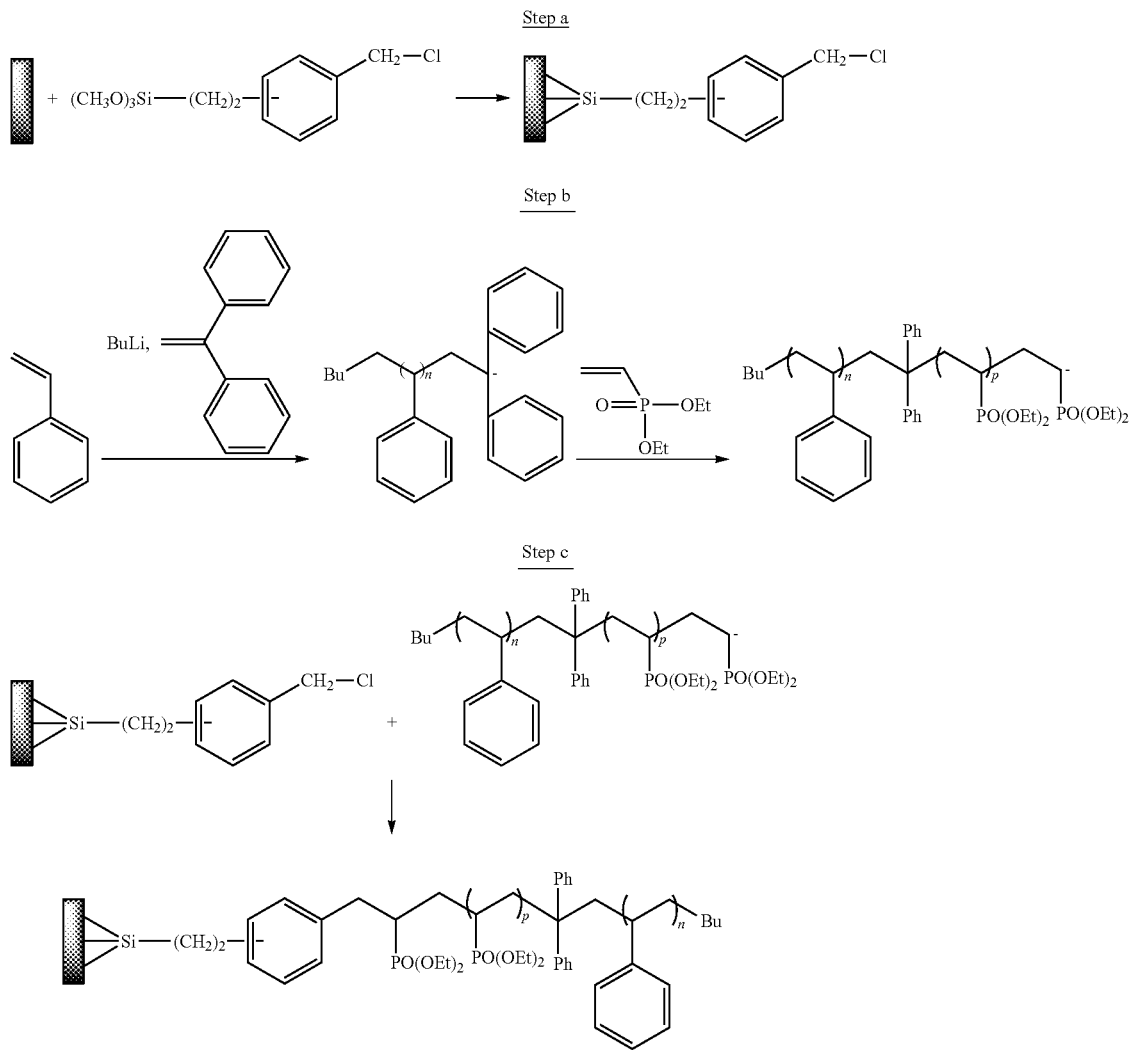

At the end of step c, it is proceeded with a hydrolysis of the —PO(OEt)$_2$ groups not shown in this scheme.

The vertical solid line represents a silica particle, the horizontal solid line represents a negative charge, Bu represents an n-butyl group, Et represents an ethyl group, Ph represents a phenyl group, n and p represent the number of recurrences of the units taken between brackets.

Step a—Grafting of Silica Particles with Chloromethylphenylethyltrimethoxysilane A suspension of 4 g of silica particles with an average particle size of 7 nm in 300 mL of toluene is refluxed with magnetic stirring and with ultrasonic waves for 1 hour. After adding 6 mL of chloromethylphenylethyltrimethoxysilane, the mixture is reacted for 4 hours with reflux. The thereby functionalized particles are then isolated and washed with ethanol, in order to remove the non-grafted chloromethylphenylethyltrimethoxysilane as well as the hydrolysis product. The obtained powder is dried in vacuo at 100° C. for 24 hours.

A $^{13}$C NMR analysis of the obtained particles shows a chloromethyl group at 46 ppm, which confirms the presence of this group on said particles, this group forming a termination group for anionic polymerization.

A solution S1 of 500 mg of powder prepared in this way, dispersed in 50 mL of tetrahydrofurane (THF) is prepared. This solution is degassed with 7 vacuum/argon cycles and maintained under an inert argon atmosphere.

Step b-Anionic Polymerization of Diethyl Vinylphosphonate and of Styrene

In a 250 mL reactor, equipped with a gas/vacuum inlet, with a thermometer and with a septum, dried beforehand at at least 100° C. for 24 hours, are introduced 100 mL of anhydrous tetrahydrofurane (THF). The solution is set under magnetic stirring, cooled to −78° C. and then maintained at this temperature. The system is degassed with at least 7 vacuum/argon cycles. The system is maintained under a very slight sweep of argon. A known amount (100 μL) of 2.4 M butyl lithium is introduced in order to neutralize the impurities contained in the tetrahydrofurane (THF). 50 μL (0.125 mmol) of butyl lithium are again introduced in order to be used as a polymerization initiator followed by the slow addition of 6.25 mmol (0.65 g) of styrene so as to keep the temperature of the reaction mixture constant, in return for which the reaction mixture becomes red/orange. After 30 minutes, are introduced into the reaction mixture, 0.15 mmol of diphenylethylene, the reaction medium thereby becoming dark red. After 15 minutes, 12.5 mmol (2.05 g) of diethyl vinylphosphonate (symbolized as DEVP) are slowly introduced so as to keep the temperature constant. The red coloration disappears to the benefit of a slight yellow coloration. The reaction mixture is kept with stirring at −70° C. for 1 h 30 mins.

Step c—Reaction Between the Polymer Prepared in Step b) and the Particles Prepared in Step a)

The solution S1 prepared in step a) is injected into the reactor containing the reaction medium from step b) via a cannula. The whole is stirred under stirring for 12 hours.

The particles obtained are then purified by evaporation of the reaction medium. After drying, the grafted particles are hydrolyzed in a solution of hydrochloric acid with a reflux for 7 days.

Example 3

This example illustrates the preparation of a composite material from particles prepared according to Example 1 or 2.

To do this, a suspension of 1 g of functionalized particles in 10 g of dimethylsulfoxide is homogenized under magnetic stirring for 24 hours at 50° C. before adding 1 g of polyvinylidene fluoride. The mixture is then homogenized under magnetic stirring for hours. The homogeneous mixture is then cast on a horizontal glass plate and the thickness of the liquid film is uniformized by passing an applicator calibrated to 500 μm. After drying the film under a hood with lamina flow, the resulting composite material is easily detached from its support by immersion in water.

The invention claimed is:

1. A method for functionalization of inorganic particles by polymers comprising at least one recurrent unit bearing at least one proton exchange group, said method comprising the following steps:
   a) contacting inorganic particles with an anionic polymerization termination agent to obtain functionalized inorganic particles bound through covalent bonds to said anionic polymerization termination agent, wherein said anionic polymerization termination agent comprises:
   at least one functional group capable of reacting with at least one group present at the surface of the inorganic particles to form a covalent bond; and
   at least one group capable of reacting with a reactive end bearing a negative charge of a polymer to form a covalent bond;
   b) anionically polymerizing at least one monomer bearing at least one precursor group of a proton exchange group to obtain a polymer comprising:
   at least one recurrent unit bearing at least one precursor group of a proton exchange group; and
   a reactive end bearing a negative charge;
   c) contacting the functionalized inorganic particles obtained in step a) with the polymer obtained in step b), whereby the reactive end bearing a negative charge of the polymer reacts with the group capable of reacting with a reactive end bearing a negative charge of a polymer to form a covalent bond; and
   d) transforming the precursor group(s) into said proton exchange group(s), resulting in inorganic particles functionalized by polymers comprising at least one recurrent unit bearing at least one proton exchange group.

2. The functionalization method according to claim 1, wherein the inorganic particles are selected from zeolite particles, zirconium phosphate particles, zirconium phosphonate particles, clay particles, and oxide particles.

3. The functionalization method according to claim 1, wherein the inorganic particles are oxide particles.

4. The functionalization method according to claim 3, wherein the oxide particles are selected from silica particles, alumina particles, zirconia particles and titanium oxide particles.

5. The functionalization method according to claim 3, wherein the oxide particles are silica particles.

6. The functionalization method according to claim 1, wherein the functional group of the anionic polymerization termination agent is selected from the groups of the following formulae:
   —$COOR^1$ with $R^1$ representing a hydrogen atom, an alkyl group comprising from 1 to 30 carbon atoms or a phenyl group;
   —COCl;
   —$COCH_2CO$—$R^1$ with $R^1$ representing a hydrogen atom, an alkyl group comprising from 1 to 30 carbon atoms or a phenyl group;
   —$PO(OH)_2$, —$PO(OR^2)(OH)$ or —$PO(OR^2)(OR^3)$ with $R^2$ and $R^3$, either identical or different, representing an alkyl group comprising from 1 to 30 carbon atoms or a phenyl group;
   —CO(NHOH);
   -$M(OR^4)_{n-x-1}Z_x$ with x being an integer ranging from 0 to (n−1), M being a metal or a metalloid, n being a degree of oxidation of M, $R^4$ representing a hydrogen atom, an alkyl group comprising from 1 to 30 carbon atoms, a phenyl group, a monovalent metal cation, or a group of formula $N^+R^1_4$, with $R^1$ representing a hydrogen atom, an alkyl group comprising from 1 to 30 carbon atoms, or a phenyl group, and Z represents a hydrogen atom, an alkyl group comprising from 1 to 30 carbon atoms, a phenyl group or a halogen atom;
   —$SO_3M'$ with M' representing a hydrogen atom, a monovalent metal cation or a group of formula $N^+R^1_4$ with $R^1$ representing a hydrogen atom, an alkyl group comprising from 1 to 30 carbon atoms or a phenyl group;
   —$B(OM')_2$ with M' representing a hydrogen atom, a monovalent metal cation or a group of formula $N^+R^1_4$ with $R^1$ representing a hydrogen atom, an alkyl group comprising from 1 to 30 carbon atoms or a phenyl group; and
   —OH;
   and combinations thereof.

7. The functionalization method according to claim 1, wherein the functional group of the anionic polymerization termination agent is a group of formula $M(OR^4)_{n-x-1}Z_x$ with x being an integer ranging from 0 to (n−1), M being a metal or a metalloid, n being a degree of oxidation of M, $R^4$ representing a hydrogen atom, an alkyl group comprising from 1 to 30 carbon atoms, a phenyl group, a monovalent metal cation, or a group of formula $N^+R^1_4$, with $R^1$ representing a hydrogen atom, an alkyl group comprising from 1 to 30 carbon atoms, or a phenyl group, and Z represents a hydrogen atom, an alkyl group comprising from 1 to 30 carbon atoms, a phenyl group or a halogen atom.

8. The functionalization method according to claim 7, wherein the functional group of the anionic polymerization termination agent is a group for formula —$Si(OR^4)_{3-x}Z_x$ with x being an integer ranging from 0 to 3.

9. The functionalization method according to claim 1, wherein the anionic polymerization termination agent is a halogenoalkoxysilane compound.

10. The functionalization method according to claim 9, wherein the anionic polymerization termination agent is a compound of the following formula:

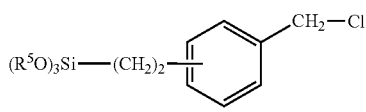

wherein $R^5$ is a methyl group or an ethyl group.

11. The functionalization method according to claim 1, wherein the proton exchange group is a sulfonic acid group —$SO_3H$, a carboxylic acid group —$CO_2H$ or a phosphonic acid group —$PO_3H_2$, wherein these groups may optionally appear as a salt.

12. The functionalization method according to claim 1, wherein, when the proton exchange group is a sulfonic acid group —$SO_3H$, a carboxylic acid group —$CO_2H$ or a phosphonic acid group —$PO_3H_2$, optionally as a salt, and the precursor group of these groups is a carboxylic acid ester group, a sulfonic acid ester group or a phosphonic acid ester group, respectively.

13. The functionalization method according to claim 1, wherein the proton exchange group is a phosphonic acid group —$PO_3H_2$, optionally as salts, in which case the precursor group of phosphonic acid is a phosphonic acid ester group.

14. The functionalization method according to claim 1, wherein the monomer(s) used in step b) are ethylenic monomers bearing a phosphonic acid ester group.

15. The functionalization method according to claim 1, wherein the monomer(s) used in step b) fit the following formula:

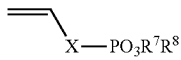

wherein:
* X is a simple bond or a benzyl group;
* $R^7$ and $R^8$ represent an alkyl group.

16. The functionalization method according to claim 15, wherein, when X is a simple bond, the monomer(s) used during step b) are selected from diethyl vinylphosphonate ($R^7$ and $R^8$ then representing an ethyl group), dimethyl vinylphosphonate ($R^7$ and $R^8$ then representing a methyl group), diisopropyl vinylphosphonate ($R^7$ and $R^8$ then representing a diisopropyl group).

17. The functionalization method according to claim 15, wherein, when X is a benzyl group, the monomer(s) used during step b) are selected from diethylbenzylphosphonate ($R^7$ and $R^8$ then representing an ethyl group), dimethylbenzylphosphonate ($R^7$ and $R^8$ representing a methyl group).

18. The functionalization method according to claim 1, wherein step b) takes place in the presence of monomer(s) selected from styrenic monomers and methacrylate monomers.

19. The functionalization method according to claim 18, wherein the styrenic monomers are selected from styrenics, paramethylstyrene and mixtures thereof.

20. The functionalization method according to claim 1, wherein:

the particles are silica particles;

the termination agent is a halogenoalkoxysilane compound;

the monomer including a precursor group of a proton exchange group used in step b) is diethyl vinylphosphonate, this monomer being optionally used in combination with at least one styrenic monomer.

* * * * *

UNITED STATES PATENT AND TRADEMARK OFFICE
CERTIFICATE OF CORRECTION

PATENT NO. : 9,227,187 B2  
APPLICATION NO. : 13/990226  
DATED : January 5, 2016  
INVENTOR(S) : Janick Bigarre Page 1 of 1

It is certified that error appears in the above-identified patent and that said Letters Patent is hereby corrected as shown below:

Title Page, Item 74: "Hulquist, PLLC" should be -- Hultquist, PLLC --.

Signed and Sealed this
Twenty-sixth Day of April, 2016

Michelle K. Lee
*Director of the United States Patent and Trademark Office*